(12) United States Patent  
Takahashi et al.

(10) Patent No.: US 9,025,026 B2  
(45) Date of Patent: May 5, 2015

(54) MONITORING CAMERA APPARATUS

(75) Inventors: Hiroaki Takahashi, Yokohama (JP);  
Kenji Kakinoki, Yokohama (JP);  
Takami Hasegawa, Yokohama (JP)

(73) Assignee: Jai Corporation, Yokohama-shi, Kanagawa (JP)

( * ) Notice: Subject to any disclaimer, the term of this patent is extended or adjusted under 35 U.S.C. 154(b) by 341 days.

(21) Appl. No.: 13/811,857

(22) PCT Filed: Aug. 21, 2012

(86) PCT No.: PCT/JP2012/071524  
§ 371 (c)(1),  
(2), (4) Date: Jan. 23, 2013

(87) PCT Pub. No.: WO2014/020774  
PCT Pub. Date: Feb. 6, 2014

(65) Prior Publication Data  
US 2014/0192190 A1 Jul. 10, 2014

(30) Foreign Application Priority Data

Aug. 1, 2012 (JP) ................ 2012-170733

(51) Int. Cl.  
*H04N 7/18* (2006.01)  
*G06K 9/00* (2006.01)  
*G06K 9/20* (2006.01)  
*H04N 9/04* (2006.01)

(52) U.S. Cl.  
CPC .. *H04N 7/18* (2013.01); *G06K 9/00* (2013.01); *G06K 9/00825* (2013.01); *G06K 9/2027* (2013.01); *H04N 9/045* (2013.01)

(58) Field of Classification Search  
CPC ... G06K 9/00825; G06K 9/2027; H04N 7/18; H04N 9/045  
USPC ......... 348/143, 135, 144, 149, 148, 169, 180; 340/907, 937, 469, 458  
See application file for complete search history.

(56) References Cited

U.S. PATENT DOCUMENTS 7,825,829 B2 * 11/2010 Madsen ................ 340/937  
2012/0206050 A1 * 8/2012 Spero ..................... 315/152

FOREIGN PATENT DOCUMENTS

JP 2007-257303 A 10/2007  
JP 2009-055504 A 3/2009  
(Continued)

OTHER PUBLICATIONS

PCT, "International Search Report and Written Opinion for PCT/JP2012/071524", Oct. 30, 2012.

*Primary Examiner* — Jefferey Harold  
*Assistant Examiner* — Jean W Desir  
(74) *Attorney, Agent, or Firm* — Manabu Kanesaka (57) ABSTRACT

Provided is a monitoring camera apparatus that can pick up, when an image of a signal lamp of a traffic signal is picked up by a monitoring camera at night, an image of an image pickup region other than the signal lamp bright without saturating a red signal lamp.

The monitoring camera apparatus includes signal controlling means including RGB ratio detecting means for detecting lighting, lighting/extinguishing times, the shape and the number, or signal lamp control signals of signal lamps of a traffic signal in the image pickup region and detecting ratios of RGB signals of the signal lamps, gain controlling means for controlling a gain of the RGB signals, and color mixture controlling means for controlling color mixtures of respective signal lamp colors. The signal controlling means detects ratios of RGB signal levels on the basis of lighting, lighting/extinguishing times, the shape and the number, or signal lamp control signals of respective signal lamps of green, yellow, and red, specifies the signal lamps as a red signal lighting region of a red signal lamp if R>G≈B, attenuates GB signals or reduces the GB signals to zero and reduces color mixture in the color signal lighting region with the color mixture controlling means, and makes it possible to display lighting of the red signal lamp as a red color on a monitor.

9 Claims, 5 Drawing Sheets

(56) References Cited

FOREIGN PATENT DOCUMENTS

| | | |
|---|---|---|
| JP | 2009-244946 A | 10/2009 |
| JP | 2010-224925 A | 10/2010 |
| JP | 2011-216051 A | 10/2011 |
| WO | 2010/116922 A1 | 10/2010 |

* cited by examiner

MONITORING CAMERA APPARATUS

RELATED APPLICATIONS

The present application is National Phase of International Application No. PCT/JP2012/071524 filed Aug. 21, 2012, and claims priority from Japanese Application No. 2012-170733 filed Aug. 1, 2012.

TECHNICAL FIELD

The present invention relates to a monitoring camera apparatus including signal controlling means corresponding to each of red, green, and blue signals of an object image output from a solid-state image pickup device and relates to a monitoring camera apparatus that can pick up an image of red light of a red signal lamp in an image pickup region without saturating the red light even in night image pickup.

BACKGROUND ART

Color television cameras using solid-state image pickup devices are in widespread use. General people can easily pick up images. A color television camera increased in sensitivity for night image pickup is also provided.

A monitoring color television camera is also increased in resolution and sensitivity. A large number of color television cameras are set in a town for crime prevention and are actively used.

Although in both the color television camera and the monitoring color television camera almost no deficiency is felt in image pickup in the daytime, during night image pickup, however, if an illumination lamp or signal lamps of a traffic signal in an intersection or the like are present in an image pickup region of the color television cameras, there is a deficiency that electronic shutter controlling means of a solid-state image pickup device or an automatic gain control circuit is actuated by a signal level of the lamp and a dark part is not faithfully reproduced, although a signal of the illumination lamp, the signal lamps of the traffic signal, or the like is controlled at a proper level.

If it is attempted to improve dark part reproducibility, a video of the illumination lamp, the signal lamps of the traffic signal, or the like changes to a white solid. Even if the video is corrected in terms of a circuit by white compression, a knee characteristic, there is a limit in the correction.

Therefore, Japanese Patent Laid-Open No. 2009-55504 of Patent Literature 1 discloses an invention of a monitoring camera apparatus that can perform monitoring in the daytime and at night and can monitor even a monitoring target having steep luminous intensity distribution, intense directivity, and high luminance such as an LED traffic signal without causing white void (white solid) in a picked-up image and while keeping color reproducibility.

An optical filter having a region in which an object light amount from a monitoring region is further attenuated than the other portions is automatically inserted into or retracted from an optical path between a lens and an image pickup device in the monitoring camera apparatus according to a video signal level in the monitoring camera apparatus. The monitoring camera apparatus can pick up an image without causing deterioration in color reproducibility due to white void in a monitoring image.

Therefore, the optical filter disposed in the optical path between the lens and the image pickup device includes a filter region of a glass or plastic substrate where an ND filter is absent in a frame body and a filter region where an ND filter vapor-deposited with a light absorbing or reflecting material or the like is present on the surface of a plastic substrate or the like. The optical filter is mechanically slid in the longitudinal direction of the optical filter to thereby enable the filter regions, which can partially attenuate a light amount, to intrude into and retract from the optical path.

CITATION LIST

Patent Literature

Patent Literature 1: Japanese Patent Laid-Open No. 2009-55504

SUMMARY OF INVENTION

Technical Problem

However, in the monitoring camera apparatus of Patent Literature 1, (A) When a filter that can partially attenuate a light amount is inserted, in an attenuation region of the filter, for example, a proper level of a traffic signal or the like can be obtained for by an ND filter having transmittance of 1 to 2%. However, an object image near signal lamps of a traffic signal has a signal level of 1 to 2%. It is difficult to visually recognize the object image.

(B) The positions and the number of signal lamps of a traffic signal in an image pickup region are various depending on a setting place of the monitoring camera apparatus. A position change for the ND filter has to be performed every time the monitoring camera apparatus is set.

(C) A mechanism for vapor-depositing the ND filter on the surface of the plastic substrate or the like and mechanically sliding the substrate is necessary. Therefore, product costs rise and, at the same time, a failure frequency increases and costs for maintenance and the like also increase.

(D) In a monitoring camera using outside the region of the ND filter or a general 1CCD solid-state image pickup device, if a gain of an amplifier is increased to make it easy to monitor a dark part, in particular, at night, a picked-up image of a red signal lamp of a traffic signal is saturated to change to light yellow or completely saturated to change to white. Therefore, it is likely that the red signal lamp is misrecognized.

Therefore, the present invention provides a monitoring camera apparatus that does not use a filter and a sliding mechanism for the filter and, taking notice of a characteristic of a solid-state image pickup device and a light-emission wavelength characteristic of an LED light-emitting device, when, even at night, a region where signal lamps of a traffic signal are present in an image pickup region is detected as a red signal lighting region on the basis of red light of a red signal lamp of the region, attenuates of green and blue signal levels in the region or reduces the signal levels to zero, and outputs a signal only as a red signal to thereby enable a user to always visually recognize the red signal lamp as red with a monitor, prevent saturation of an output signal level of a picked-up image of the signal lamps of the traffic signal, and enable the user to visually recognize an image pickup region other than the signal lamps of the traffic signal at a proper level through lens aperture control, electronic shutter control, and gain control of the solid-state image pickup device.

Solution to Problem

The inventor of this application has solved the problem with means explained below.

(1) A monitoring camera apparatus comprising: a solid-state image pickup device; and signal controlling means corresponding to each of RGB signals of an object image output from the solid-state image pickup device, the monitoring camera apparatus monitoring a street including a traffic signal, wherein the signal controlling means includes:

signal lamp detecting means for detecting lighting of signal lamps including LED light-emitting devices of a traffic signal present in an image pickup region of the solid-state image pickup device;

lighting/extinguishing region detecting means for detecting a lighting/extinguishing region for periodically repeating lighting, extinguishing, and lighting of the detected signal lamps;

RGB ratio detecting means for detecting ratios of RGB signals of the lighting/extinguishing region output from the lighting/extinguishing region detecting means;

color mixture controlling means for controlling color mixture of signal lamp colors; and gain controlling means for controlling a gain of the RGB signals, the signal lamp detecting means detects, on the basis of a spectral sensitivity characteristic of the solid-state image pickup device and a light emission wavelength characteristic of the LED light-emitting devices of each of the RGB signals output from the solid-state image pickup device, three regions indicated by xy coordinate values of pixels arrayed in a lateral direction or a longitudinal direction in the image-pickup region and in series and periodically repeatedly lit and extinguished, the lighting/extinguishing region detecting means specifies, on the basis of the regions indicated by the xy coordinate values of the pixels output from the signal lamp detecting means, the three lit/extinguished lighting/extinguishing regions and sends the lighting/extinguishing regions to the RGB ratio detecting means, the RGB ratio detecting means compares levels of the RGB signals during the lighting of the lighting/extinguishing regions and detects the signal lamp as a red signal lamp if R>G≈B, as a yellow signal lamp if R>G>B, and as a green signal lamp if G>B>R, the RGB ratio detecting means further specifies, on the basis of a region indicated by the xy coordinate value of the pixel of the lighting/extinguishing region having a signal level of R>G≈B, the region as a red signal lighting region and sends the red signal lighting region to the color mixture controlling means, the color mixture controlling means attenuates GB signals in the red signal lighting region or reduces the GB signals to zero, reduces color mixture in the red signal lighting region, and sends the RGB signals to the gain controlling means, and the gain controlling means controls an input R signal to enable a lighting region of the red signal lamp to be displayed as a proper red color on a monitor.

(2) The monitoring camera apparatus described in (1) above, wherein the RGB ratio detecting means compares, on the basis of a region indicated by the xy coordinate values of the pixels that output signals in synchronization with lighting times of green, yellow, and red signal lamps of the traffic signal, respective RGB signal levels in the specified lighting/extinguishing region of the respective signal lamps of green, yellow, and red, specifies the lighting/extinguishing region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

(3) The monitoring camera apparatus described in (1) or (2) above, wherein the RGB ratio detecting means compares, on the basis of a region indicated by the xy coordinate values of the pixels where an output signal level changes in synchronization with a lighting/extinguishing time or a lighting/extinguishing time interval of each of green, yellow, and red signal lamps of the traffic signal, RGB signal levels in the specified lighting/extinguishing region of the respective signal lamps of green, yellow, and red, specifies the region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

(4) The monitoring camera apparatus described in any one of (1) to (3) above, wherein the signal controlling means includes saturated region detecting means for detecting a saturated region of the RGB signals, when the saturated region of the RGB signals is detected by the saturated region detecting means according to sensitivity raising control at night or during rainy weather, the signal controlling means attenuates a signal level to be equal to or lower than a saturated level with the electronic shutter controlling means of the solid-state image pickup device and the gain controlling means, and the RGB ratio detecting means compares, on the basis of a region indicated by the xy coordinate values of the pixels where an output signal level changes in synchronization with a lighting/extinguishing time or a lighting/extinguishing time interval of each of green, yellow, and red signal lamps of the traffic signal, RGB signal levels in the specified lighting/extinguishing region of the respective signal lamps of green, yellow, and red, specifies the region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

(5) The monitoring camera apparatus described in (1) above, wherein the signal controlling means recognizes a shape of the signal lamps of the traffic signal, compares RGB signal levels of the respective signal lamps of green, yellow, and red in a portion of the shape, specifies the portion as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

(6) The monitoring camera apparatus described in (1) or (5) above, wherein the signal controlling means includes saturated region detecting means for detecting a saturated region of the RGB signals, when the saturated region of the RGB signals is detected by the saturated region detecting means according to sensitivity raising control at night or during rainy weather, the signal controlling means attenuates a signal level to be equal to or lower than a saturated level with the electronic shutter controlling means of the solid-state image pickup device and the gain controlling means and then recognizes a shape of the signal lamps of the traffic signal, compares RGB signal levels of the respective signal lamps of green, yellow, and red in a portion of the shape, specifies the portion as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

(7) The monitoring camera apparatus described in (1) above, wherein the signal controlling means receives blinking control signals of the signal lamps of the traffic signal, specifies the red signal lamp lit on the basis of a blinking control signal of the red signal lamp as a red signal lighting region, attenuates GB signals in the red signal lighting region or reduces the GB signals to zero and reduces color mixture in the red signal lighting region with the color mixture controlling means, and makes it possible to display lighting of the red signal lamp as a red color on the monitor.

(8) The monitoring camera apparatus described in any one of (1) to (7) above, wherein the signal controlling means stores, in a memory, the red signal lighting region specified as a red signal lighting region of a red signal from RGB signal ratios of the signal lamps of the traffic signal not saturated in the daytime, attenuates GB signals in the red signal lighting region or reduces the GB signals to zero and reduces color mixture in the red signal lighting region with the color mixture controlling means on the basis of the red signal lighting region always read out from the memory, and makes it possible to display lighting of the red signal lamp as a red color on the monitor.

(9) The monitoring camera apparatus described in (8) above, wherein the signal controlling means stores, in a memory, respective RGB signal levels during lighting and during extinguishing of the signal lamps of the traffic signal and subtracts the RGB signal levels during the extinguishing from the RGB signal levels during the lighting on the basis of respective signal levels during the lighting and during the extinguishing of the signal lamps read out from the memory.

Advantageous Effects of Invention

Effects explained below are exhibited by the present invention.

<1> According to the present invention,
in a monitoring camera apparatus comprising: a solid-state image pickup device; and signal controlling means corresponding to each of RGB signals of an object image output from the solid-state image pickup device, the monitoring camera apparatus monitoring a street including a traffic signal, the signal controlling means includes:
signal lamp detecting means for detecting lighting of signal lamps including LED light-emitting devices of a traffic signal present in an image pickup region of the solid-state image pickup device;
lighting/extinguishing region detecting means for detecting a lighting/extinguishing region for periodically repeating lighting, extinguishing, and lighting of the detected signal lamps;
RGB ratio detecting means for detecting ratios of RGB signals of the lighting/extinguishing region output from the lighting/extinguishing region detecting means;
color mixture controlling means for controlling color mixture of signal lamp colors; and
gain controlling means for controlling a gain of the RGB signals, the signal lamp detecting means detects, on the basis of a spectral sensitivity characteristic of the solid-state image pickup device and a light emission wavelength characteristic of the LED light-emitting devices of each of the RGB signals output from the solid-state image pickup device, three regions indicated by xy coordinate values of pixels arrayed in a lateral direction or a longitudinal direction in the image-pickup region and in series and periodically repeatedly lit and extinguished, the lighting/extinguishing region detecting means specifies, on the basis of the regions indicated by the xy coordinate values of the pixels output from the signal lamp detecting means, the three lit/extinguished lighting/extinguishing regions and sends the lighting/extinguishing regions to the RGB ratio detecting means, the RGB ratio detecting means compares levels of the RGB signals during the lighting of the lighting/extinguishing regions and detects the signal lamp as a red signal lamp if $R>G\approx B$, as a yellow signal lamp if $R>G>B$, and as a green signal lamp if $G>B>R$. Therefore, it is possible to clearly distinguish the signal lamps of the traffic signal from other illuminations, lightings, or the like present and blinking in a monitoring screen and specify the signal lamps as the signal lamps of the traffic signal.

The RGB ratio detecting means further specifies, on the basis of a region indicated by the xy coordinate value of the pixel of the lighting/extinguishing region having a signal level of $R>G\approx B$, the region as a red signal lighting region and sends the red signal lighting region to the color mixture controlling means, and the color mixture controlling means attenuates GB signals in the red signal lighting region or reduces the GB signals to zero, reduces color mixture in the red signal lighting region, and sends the RGB signals to the gain controlling means, and the gain controlling means controls an input R signal to enable a lighting region of the red signal lamp to be displayed as a proper red color on a monitor. Therefore, it is possible to compare, making use of sequentially performing lighting/extinguishing of the signal lamps in the image pickup region, the RGB signal levels on the basis of the regions indicated by the xy coordinate values of the signal lamps during the lighting. Since a G signal and a blue signal are about $5\pm2\%$ to $4\pm2\%$ when an R signal is 90 to 100% in the red signal lighting region as explained below from a spectral sensitivity of a red channel of a 1CCD solid-state image pickup device and a light emission wavelength characteristic of a red LED light-emitting device, it is possible to distinguish the red signal lamp from the other yellow signal lamp ($R>G>B$) and green signal lamp ($G>R>B$) if $R>G\approx B$ and specify the red signal lighting region as the red signal lighting region of the red signal lamp.

Further, when the electronic shutter controlling means of the solid-state image pickup device is controlled to increase sensitivity to make a surrounding situation visible at night or during rainy weather, it is possible to control the electronic shutter controlling means of the solid-state image pickup device and the gain without worrying about saturation of the red signal even if gain is increased by the gain controlling means. Therefore, it is possible to clearly visually recognize an object in a region other than the signal lamps.

Furthermore, a degree of freedom of a control range of the electronic shutter controlling means of the solid-state image pickup device and the gain controlling means is increased to make it possible to clearly see other objects around the signal lamps of the traffic signal even during saturation of a signal.

It is possible to detect that an output signal level of the red signal lamp present in the object in the image pickup region is $R>G\approx B$ and output the red signal lamp as a red signal in a pure electric manner. Therefore, since it is unnecessary to use an electric mechanism for vapor-depositing an ND filter on the surface of a plastic substrate or the like and mechanically sliding the substrate, it is possible to realize improvement of reliability and a reduction in costs.

<2> According to the present invention, in addition to the effects in <1>, the RGB ratio detecting means compares, on the basis of a region indicated by the xy coordinate values of the pixels that output signals in synchronization with lighting times of green, yellow, and red signal lamps of the traffic signal, respective RGB signal levels in the specified lighting/extinguishing region of the respective signal lamps of green, yellow, and red, specifies the lighting/extinguishing region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor. Therefore, ratios of RGB signal levels of the respective signal lamps of green, yellow, and red are detected on the basis of a region indicated by the xy coordinate values of the pixels that output signals in synchronization with lighting/extinguishing times of the green, yellow, and red signal lamps of the traffic signal or two lamps of red and yellow, red and green, or the like and the region is specified as the red signal lighting region of the red signal lamp. Therefore, it is possible to clearly distinguish the signal lamps of the traffic signal from blinking other illuminations, lightings, or the like and display lighting of the red signal lamp as a red color on the monitor.

<3> According to the present invention, in addition to the effects in <1> and <2>, the RGB ratio detecting means compares, on the basis of a region indicated by the xy coordinate values of the pixels where an output signal level changes in synchronization with a lighting/extinguishing time or a lighting/extinguishing time interval of each of green, yellow, and red signal lamps of the traffic signal, respective RGB signal levels in the specified lighting/extinguishing region of the signal lamps of green, yellow, and red, specifies the region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor. Therefore, it is possible to more surely detect the red signal lighting region of the red signal lamp on the basis of the region indicated by the xy coordinate values of signal lamp lighting synchronized with lighting/extinguishing times or lighting/extinguishing time intervals in designated order of green>yellow<red≈green of the three signal lamps of green, yellow, and red set in an intersection and clearly distinguish the lighting of the red signal lamp from blinking other illuminations, lightings, or the like and display the red signal lamp as a red color on the monitor.

<4> According to the present invention, in addition to the effects in <1> to <3>, the signal controlling means includes saturated region detecting means for detecting a saturated region of the RGB signals, when the saturated region of the RGB signals is detected by the saturated region detecting means according to sensitivity raising control at night or during rainy weather, the signal controlling means attenuates a signal level to be equal to or lower than a saturated level with the electronic shutter controlling means of the solid-state image pickup device and the gain controlling means, and the RGB ratio detecting means compares, on the basis of a region indicated by the xy coordinate values of the pixels where an output signal level changes in synchronization with a lighting/extinguishing time or a lighting/extinguishing time interval of each of green, yellow, and red signal lamps of the traffic signal, respective RGB signal levels in the specified lighting/extinguishing region of signal lamps of green, yellow, and red, specifies the region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor. Therefore, even if the signal lamps of the traffic signal are in a saturated state at night, during rainy weather, or the like, the signal level is attenuated to be equal to or lower than the saturated level by the electronic shutter controlling means of the solid-state image pickup device and the gain controlling means and then the ratios of the RGB signal levels of the respective signal lamps of green, yellow, and red are detected. Therefore, it is possible to surely specify the red signal lamp as the red signal lighting region.

After the signal level is attenuated to be equal to or lower than the saturated level, the red signal lighting region can be specified as the red signal lighting region of the red signal lamp if R>G≈B and the GB color signal levels in the red signal lighting region can be attenuated or output as zero. Therefore, it is possible to prevent the signal lamps from becoming saturated to thereby change to yellowish or white.

Further, it is possible to control the electronic shutter controlling means of the solid-state image pickup device and the gain controlling means to proper values after the red signal lighting region is specified as the red signal lighting region of the red signal lamp. It is possible to attenuate the GB signals in the red signal lighting region or reduce the GB signals to zero and reduce color mixture in the red signal lighting region with the color mixture controlling means and display the lighting of the red signal lamp as a red color on the monitor.

<5> According to the present invention, in addition to the effects in <1>, the signal controlling means recognizes a shape of the signal lamps of the traffic signal, compares RGB signal levels of the respective signal lamps of green, yellow, and red in a portion of the shape, specifies the portion as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor. The three (or two) signal lamps of the traffic signal arrayed in the lateral direction or the longitudinal direction in series are recognized by the shape thereof and the shape is specified as the red signal lighting region of the red signal lighting. Therefore, it is possible to clearly distinguish the signal lamps from illuminations, lightings, or the like having other shapes and display the red signal lamp as a red color on the monitor at night.

<6> According to the present invention, in addition to the effects in <1> and <5>, the signal controlling means includes saturated region detecting means for detecting a saturated region of the RGB signals, when the saturated region of the RGB signals is detected by the saturated region detecting means according to sensitivity raising control at night or during rainy weather, the signal controlling means attenuates a signal level to be equal to or lower than a saturated level with the electronic shutter controlling means of the solid-state image pickup device and the gain controlling means and then recognizes a shape of the signal lamps of the traffic signal, compares RGB signal levels of the respective signal lamps of green, yellow, and red in a portion of the shape, specifies the portion as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor. Therefore, even if the signal lamps of the traffic signal are in the saturated state according to the sensitivity raising control at night or during rainy weather, the signal level is once attenuated to be equal to or lower than the saturated level by the electronic shutter controlling means of the solid-state image pickup device and the gain controlling means and then the shape is recognized. Therefore, it is possible to prevent a malfunction due to the saturated state and accurately recognize the red signal lamp as a red color.

Further, it is possible to control the electronic shutter controlling means of the solid-state image pickup device and the gain controlling means to proper values after the red signal lighting region is specified as the red signal lighting region of the red signal lamp. It is possible to attenuate the GB signals in the red signal lighting region or reduce the GB signals to zero and reduce color mixture in the red signal lighting region with the color mixture controlling means and display the lighting of the red signal lamp as a red color on the monitor. Further, it is possible to light up a region other than the signal lamps of the traffic signal and clearly recognize the region.

<7> According to the present invention, in addition to the effects in <1>, the signal controlling means receives blinking control signals of the signal lamps of the traffic signal, specifies the red signal lamp lit on the basis of a blinking control signal of the red signal lamp as a red signal lighting region, attenuates GB signals in the red signal lighting region or reduces the GB signals to zero and reduces color mixture in the red signal lighting region with the color mixture controlling means, and makes it possible to display lighting of the red signal lamp as a red color on the monitor. Therefore, it is possible to receive the blinking control signal of the red signal lamp of the signal lamps of the traffic signal and recognize the red signal lamp as the red signal lighting region. By setting a wire or wireless transceiver for the reception of the blinking control signal, it is possible to most surely recognize the red signal lamp and, at the same time, attenuate the GB signal or reduce the GB signal to zero and reduce color mixture in the red signal lighting region and display the lighting of the red signal lamp as a red color on the monitor.

<8> According to the present invention, in addition to the effects in <1> to <7>, the signal controlling means stores, in a memory, the red signal lighting region specified as a red signal lighting region of a red signal from RGB signal ratios of the signal lamps of the traffic signal not saturated in the daytime, attenuates GB signals in the red signal lighting region or reduces the GB signals to zero and reduces color mixture in the red signal lighting region with the color mixture controlling means on the basis of the red signal lighting region always read out from the memory, and makes it possible to display lighting of the red signal lamp as a red color on the monitor. Accordingly, the signal read from the memory is identified as the red signal lighting region even if the saturated state of the signal lamp of the traffic signal. Therefore, it is unnecessary to detect ratios of the RGB signal levels of the respective signal lamps of green, yellow, and red even if the signal lamps are in a saturated state at night. It is possible to attenuate the GB signals in the red signal lighting region or reduce the GB signals to zero and reduce color mixture in the red signal lighting region with the color mixture controlling means and accurately output the red signal lamp a red signal.

<9> According to the present invention, in addition to the effects in <8>, the signal controlling means stores, in a memory, respective RGB signal levels during lighting and during extinguishing of the signal lamps of the traffic signal and subtracts the RGB signal levels during the extinguishing from the RGB signal levels during the lighting on the basis of respective signal levels during the lighting and during the extinguishing of the signal lamps read out from the memory. Therefore, it is possible to prevent color mixture due to sunlight or peripheral illumination light reflected on the surface of the red signal lamp and output the red signal lamp as a red signal by the original RGB components of the red signal lamp or as a pure red signal without color mixture in a daytime or at night.

Similarly, the respective positions of the yellow signal and the green signal are detected from RGB signal ratios, RGB signal levels during lighting and during extinguishing are memorized, and the RGB signal levels during the extinguishing are subtracted from the RGB signal levels during the lighting on the basis of respective signal levels during the lighting and during the extinguishing read out from the memory. Consequently, it is possible to output the yellow signal and the green signal as a yellow signal and a green signal without color mixture.

BRIEF DESCRIPTION OF DRAWINGS

FIG. 2 (a) is an xy coordinate explanatory diagram of laterally arrayed signal lamps in an image pickup region in the embodiment of the present invention.

FIG. 2(b) is a light emission timing chart of the laterally arrayed signal lamps to be lit and extinguished in the image pickup region in the embodiment of the present invention.

FIG. 2(c) is an xy coordinates explanatory diagram of longitudinally arrayed signal lamps in the image pickup region in the embodiment of the present invention.

FIG. 2(d) is a light emission timing chart of the longitudinally arrayed signal lamps to be lit and extinguished in the image pickup region in the embodiment of the present invention.

DESCRIPTION OF EMBODIMENTS

Embodiments of the present invention are explained in detail on the basis of the drawings.

In the figures, reference numeral 1 denotes a monitoring camera apparatus, 2 denotes a signal lamp, 3 denotes a lens, 4 denotes a solid-state image pickup device, 5 denotes an S/H (sample hold circuit), 6 denotes A/D conversion means, 7 denotes signal controlling means, 8 denotes white balance controlling means, 9 denotes a memory, 10 denotes signal lamp detecting means, 11 denotes lighting/extinguishing region detecting means, 12 denotes RGB ratio detecting means, 13 denotes gain controlling means (including a signal processing circuit), 14 denotes color mixture controlling means, 15 denotes saturated region detecting means, 16 denotes an output terminal, 17 denotes a monitor, 18 denotes an image pickup region, 19 denotes a signal lamp image, 20 denotes solid-state image pickup device driving means (including electronic shutter controlling means), and 21 denotes synchronization signal generating means.

First Embodiment

This embodiment specifies, taking notice of the fact that three signal lamps 2 of green, yellow, and red are usually arrayed in the lateral direction or the longitudinal direction and in series in a traffic signal, specifies the signal lamp 2 to be lit and extinguished from a region indicated by xy coordinate values of an image, attenuates GB signals in a red signal lighting region of a red signal lamp or reduces the GB signals to zero and reduces color mixture in the red signal lighting region on the basis of a spectral sensitivity characteristic of a color channel of a 1CCD solid-state image pickup device 4 and a light emission wavelength characteristic of a red LED light-emitting device, and makes it possible to display lighting of the red signal lamp as a red color on the monitor 17.

Figure 1:
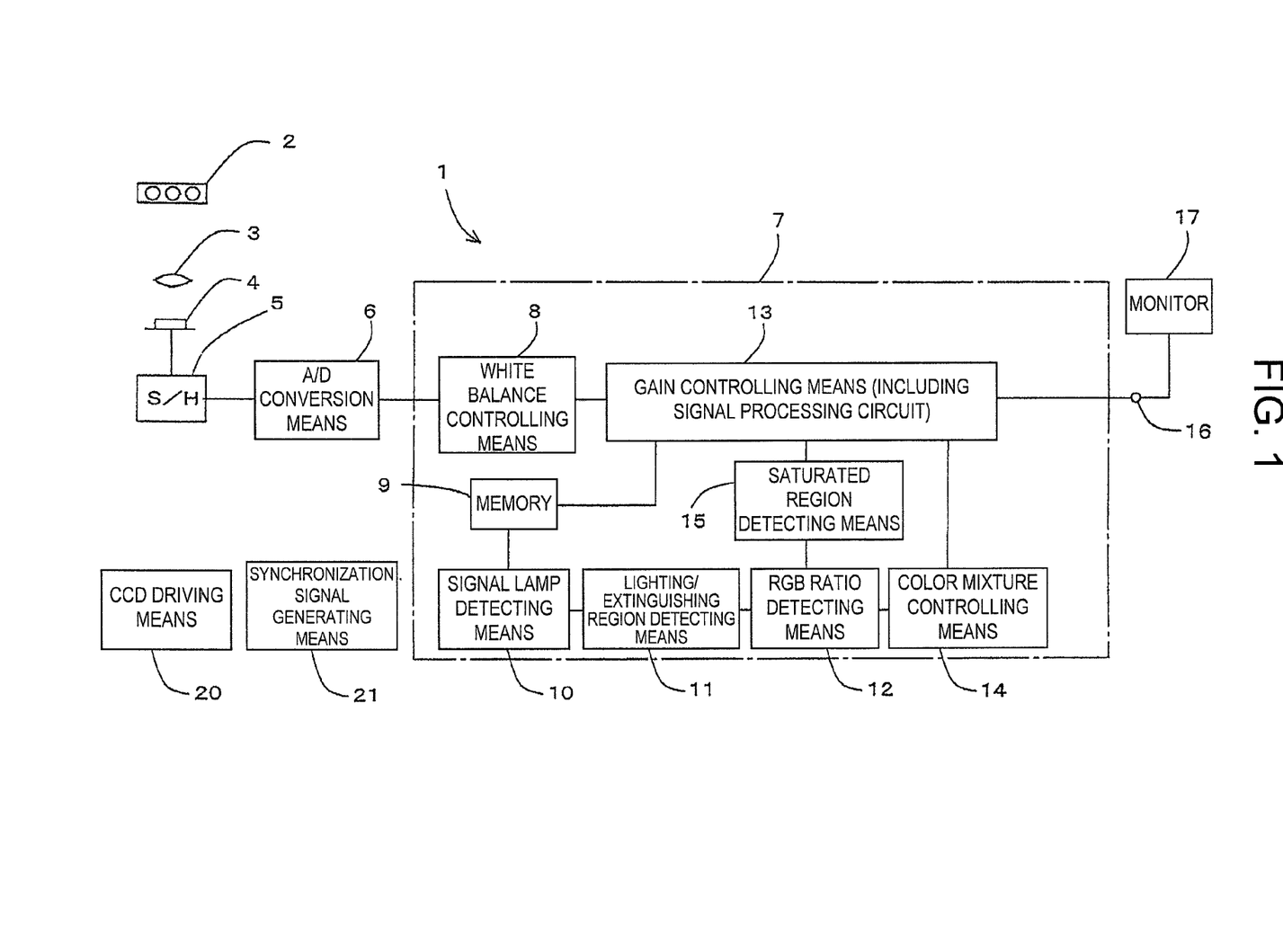
FIG. 1 is a block diagram of a monitoring camera apparatus according to an embodiment of the present invention.

The monitoring camera apparatus 1 is a monitoring camera apparatus that monitors a street including the signal lamp 2 of a traffic signal. The monitoring camera apparatus 1 includes the lens 3 for photographing the signal lamp 2 of the traffic signal set in the street, the solid-state image pickup device 4 that photoelectrically converts a video photographed by the lens 3, the solid-state image pickup device driving means (including the electronic shutter controlling means) 20 for driving the solid-state image pickup device 4, the synchronization signal generating means 21 for supplying a control pulse to circuits and controlling means, the S/H (sample hold circuit) 5 that removes noise peculiar to the solid-state image pickup device of an output signal photoelectrically converted by the solid-state image pickup device 4, and the A/D conversion means 6. An output signal of the S/H 5 is converted from analog signal into a digital signal by the A/D conversion means 6 and input to the signal controlling means 7.

Further, the signal controlling means 7 includes the white balance controlling means 8 that can detect a color temperature of an image pickup region where the lens 3 picks up an image, detect a white signal and the like in an image pickup screen, and keep a white balance of a screen with a publicly-known technique, the memory 9 that stores coordinate values and the like of detected signal lamps, the signal lamp detecting means 10 for detecting lighting of the signal lamp 2 including an LED light-emitting device of the traffic signal present in the image pickup region of the solid-state image pickup device 4, the lighting/extinguishing region detecting means 11 for detecting a lighting/extinguishing region of the detected signal lamp 2, the RGB ratio detecting means 12 for detecting ratios of RGB signals of the lighting/extinguishing region output from the lighting/extinguishing region detecting means 11, the gain controlling means 13 (including the signal processing circuit) for controlling the gain of the RGB signals and including signal processing circuits such as shading correction, gamma correction, and white compression and knee correction circuits, and the color mixture controlling means 14 for controlling color mixture of respective signal lamp colors.

The signal lamp detecting means 10 detects, on the basis of a spectral sensitivity characteristic of the solid-state image pickup device 4 and a light emission wavelength characteristic of the LED light-emitting device of each of RGB signals output from the solid-state image pickup device 4, a region indicated by xy coordinate values of pixels from signal levels and lighting duration of respective horizontal scanning lines during lighting of respective three signal lamps arrayed in the lateral direction or the longitudinal direction in the image pickup region and in series and to be periodically repeatedly lit and extinguished.

The lighting/extinguishing region detecting means 11 detects xy coordinate values of pixels at a signal level and in extinguishing duration during extinguishing of the respective signal lamps 2 periodically repeated (e.g., time after a green signal lamp is lit and then extinguished until the green signal lamp is lit next is the extinguishing duration) in the same manner as the region indicated by the xy coordinate values of the signal lamp 2 during the lighting periodically repeatedly output from the signal lamp detecting means 10 to thereby specify that the signal lamp 2 is the signal lamp 2 of the traffic signal periodically repeatedly lit and extinguished and sends an output signal thereof to the RGB ratio detecting means 12. The RGB ratio detecting means 12 compares ratios of RGB signal levels during lighting of the lighting/extinguishing region and detects and specifies the signal lamp 2 as a red signal lamp if R>G≈B (or R>>G, B), as a yellow signal lamp if R>G>B (or R, G>>B), and as a green signal lamp if G>B>R (or G, B>>R).

The RGB ratio detecting means 12 further sends a lighting signal of a red signal lighting region specified on the basis of a region indicated by the xy coordinate values of the signal lamp having the signal level of R>G≈B to the color mixture controlling means 14. The color mixture controlling means 14 attenuates GB signals in the red signal lighting region or reduces the GB signal to zero and reduces color mixture in the red signal lighting region and sends the lighting signal to the gain controlling means 13. The gain controlling means 13 controls an input R signal to make it possible to display a lighting region of a red signal lamp as a proper red color on the monitor 17.

The solid-state image pickup device 4 is explained as including three pixels of RGB.

In FIG. 1, an object image picked up by the lens 3 including an aperture mechanism and lens aperture controlling means not shown in the figure is focused on the solid-state image pickup device 4. An object image signal photoelectrically converted by the solid-state image pickup device 4 is subjected to analog/digital conversion by the A/D conversion means 6 via the S/H (sample hold) circuit 5. RGB signals subjected to the digital conversion is input to the memory 9 and the saturated region detecting means 15 via the gain controlling means 13 after a white balance of an image is controlled by the white balance controlling means 8 of the signal controlling means 7.

The RGB signals are input to the signal lamp detecting means 10 via the memory 9. Since the three signal lamps 2 of the traffic signal are usually arranged in the lateral direction or the longitudinal direction and in series, the signal lamp detecting means 10 detects a region indicated by coordinate values of the signal lamp 2 from xy coordinates of pixels of a picked-up two-dimensional image of a frame periodically repeatedly lit and extinguished in the image pickup region of the solid-state image pickup device 4, writes a region indicated by detected xy coordinate values of respective image signals during lighting and during extinguishing in the memory 9, and reads out the xy coordinate values during the lighting and during the extinguishing. Thereafter, it is possible to confirm, with the signal lamp detecting means 10 and the lighting/extinguishing region detecting means 11, from respective image signal levels and lighting/extinguishing duration, that the signal lamp 2 is the signal lamp 2 periodically repeatedly lit and extinguished as shown in FIG. 2.

Figure 2:
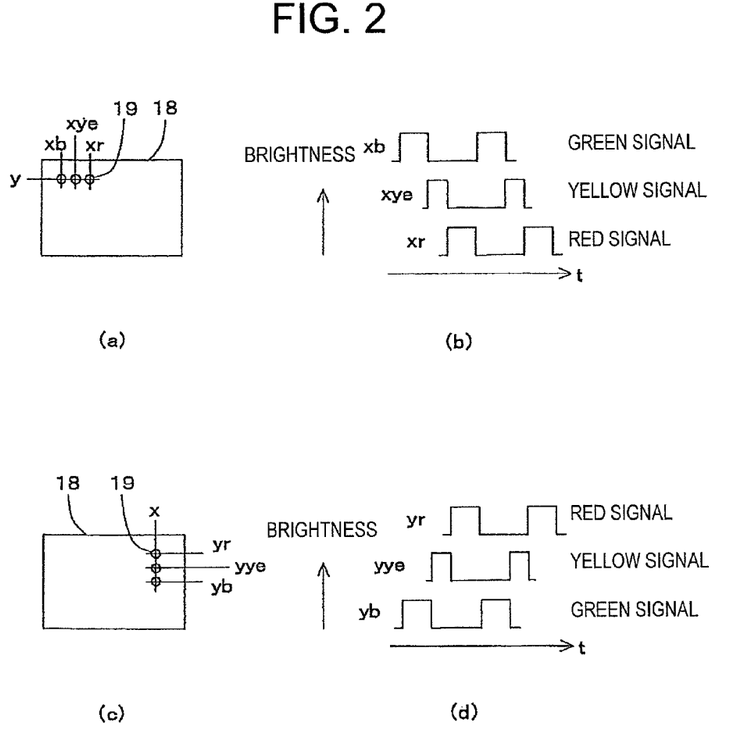

In FIG. 2, FIG. 2(a) shows an image example in which the three signal lamps 2 of the traffic signal are arrayed in the lateral direction in series.

The signal lamp detecting means 10 detects, on the basis of a region indicated by xy coordinate values read out from the memory 9, three signal lamp images 19 present in longitudinal axis direction y coordinate positions of the image pickup region 18 and three coordinate positions arrayed in series of xb, xye, and xr of the signal lamp images 19 on the x coordinate in the lateral axis direction of pixels of a picked-up two-dimensional image of a frame. Then, as shown in a light emission timing chart of FIG. 2(b), xb (a green signal) is lit and then extinguished, immediately thereafter, xye (a yellow signal) is lit and then extinguished, and subsequently, xr (a red signal) is lit and then extinguished. Therefore, it is possible to recognize that the signal lamp images 19 are the signal lamps 2 of the traffic signal.

FIG. 2(c) shows an image example in which three signal lamps 2 of the traffic signal are arrayed in the longitudinal direction in series.

The signal lamp detecting means 10 detects, on the basis of a region indicated by xy coordinate values read out from the memory 9, three signal lamp images 19 present in longitudinal axis direction x coordinate positions of the image pickup region 18 and three coordinate positions arrayed in series of yr, yye, and yb of the signal lamp images 19 on the y coordinate in the longitudinal axis direction of pixels of a picked-up two-dimensional image of a frame. Then, as shown in a light emission timing chart of FIG. 2(d), yb (a green signal) is lit and then extinguished, immediately thereafter, yye (a yellow signal) is lit and then extinguished, and subsequently, yr (a red signal) is lit and then extinguished. Therefore, it is possible to recognize that the signal lamp images 19 are the signal lamps 2 of the traffic signal.

In FIGS. 2(b) and (d), the ordinate indicates "brightness" of the signal lamps 2 and the abscissa indicates time (t).

The region indicated by the xy coordinate values of the signal lamp 2 detected by the signal lamp detecting means 10 is input to the lighting/extinguishing region detecting means 11. The lighting/extinguishing region detecting means 11 detects, on the basis of the region output from the signal lamp detecting means 10 and indicated by the xy coordinate values of the signal lamp image 19 to be lit and extinguished, lighting/extinguishing regions of respective signal lamps from levels of respective image signals read out from the memory 9 and lighting duration for each horizontal line (or vertical line) and inputs the light/extinguishing regions to the RGB ratio detecting means 12.

The RGB ratio detecting means 12 compares, on the basis of spectral sensitivity characteristics of the respective RGB signals output from the solid-state image pickup device 4 and a light emission wavelength characteristic of the LED light-emitting device, ratios of RGB signal levels during lighting of the lighting/extinguishing regions input from the lighting/extinguishing region detecting means 11. The RGB ratio detecting means 12 can detect the signal lamp 2 as a red signal lamp if R>G≈B (or R>>G, B), as a yellow signal lamp if R>G>B (or R, G>>B), and as a green signal lamp if G>B>R (or G, B>>R) and specify the signal lamp 2 as the signal lamp 2 of the traffic signal including three signals.

The RGB ratio detecting means 12 further specifies a region indicated by the xy coordinate values of the signal lamp having the signal level of R>G≈B as a red signal lighting region of a red signal lamp on the basis of the region and sends the red signal lighting region to the color mixture controlling means 14. The color mixture controlling means 14 attenuates GB signals in the red signal lighting region or reduces the GB signal to zero and reduces color mixture in the red signal lighting region and sends the RGB signals to the gain controlling means 13. The gain controlling means 13 controls an input R signal to make it possible to display a lighting region of the red signal lamp as a proper red color on the monitor.

The RGB ratio detecting means 12 detects ratios of RGB signal levels of respective signal lamps of green, yellow, and red on the basis of a region indicated by the xy coordinate values of the signal lamps synchronizing with a lighting/extinguishing time of the signal lamp 2 of the traffic signal or lighting/extinguishing times or lighting/extinguishing time intervals repeated in the order of green>yellow<red≈green of the signal lamp 2 of the traffic signal, specifies the region as a red signal lighting region of a red signal lamp if R>G≈B, attenuates GB signals in the red signal lighting region or reduces the GB signals to zero and reduces color mixture in the red signal lighting region with the color mixture controlling means 14 and sends the RGB signals to the gain controlling means 13. The gain controlling means 13 controls an input R signal to make it possible to display a lighting region of the red signal lamp as a proper red color on the monitor.

When the saturated region detecting means 15 detects the signal lamp 2 of the traffic signal in a saturated state in which a signal level exceeds 100% because of sensitivity raising control (or automatically) at night or during rainy weather, the saturated region detecting means 15 attenuates a signal level to be equal to or lower than a saturated level with the electronic shutter controlling means of the solid-state image pickup device and the gain controlling means 13 and then sends the RGB signals to the RGB ratio detecting means 12 via the memory 9, the signal lamp detecting means 10, and the lighting/extinguishing region detecting means 11.

When the signal lamp detecting means 10 sends lighting coordinate position information and lighting region information of the signal lamp 2 of the traffic signal to the RGB ratio detecting means 12 via the lighting/extinguishing region detecting means 11, the RGB ratio detecting means 12 detects ratios of RGB signal levels of the lit respective signal lamps of green, yellow, and red, specifies the signal lamps as a red signal lighting region of the red signal lamp, attenuates GB signals in the red signal lighting region or reduces the GB signals to zero and reduces color mixture in the red signal lighting region with the color mixture controlling means 14 and sends the RGB signals to the gain controlling means 13. The gain controlling means 13 controls an input R signal to output the lighting region of the red signal lamp as a proper red color from the output terminal 16 to the outside via the gain controlling means 13 from the color mixture controlling means 14.

The lighting coordinate position information and the lighting region information detected by the signal lamp detecting means 10 are stored in the memory 9.

The white balance controlling means 8 keeps a white balance using a publicly-known technique for, for example, using a white signal in an object image picked up immediately before the signal lamp detecting means 10 is actuated.

Figure 3:
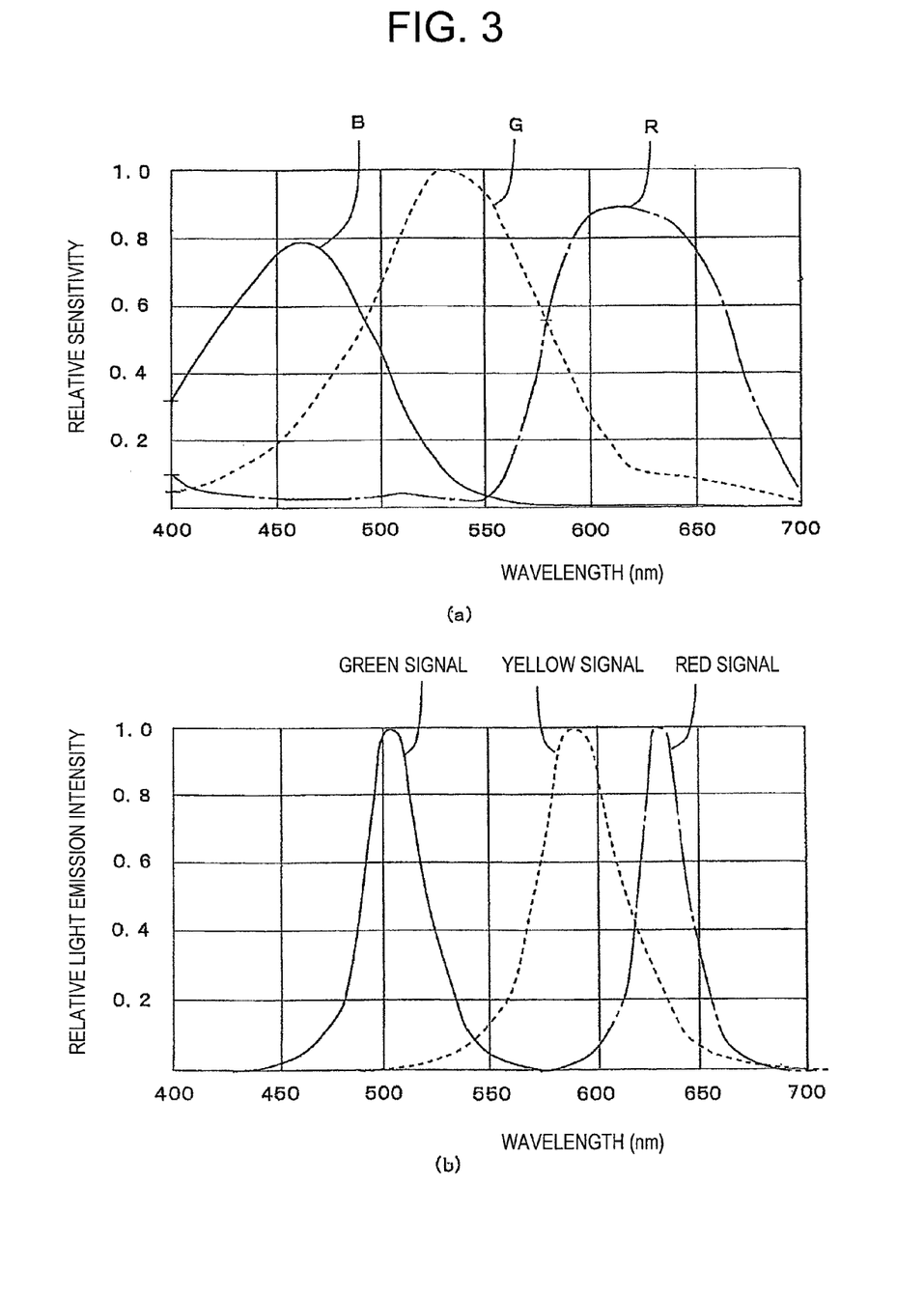
FIG. 3 is a spectral sensitivity characteristic chart of a general solid-state image pickup device and a light emission wavelength characteristic chart of signal lamps using LED light-emitting devices.

In FIG. 3, as the detection of RGB ratios, ratios of signal levels of RGB are detected by the RGB ratio detecting means 12 on the basis of a spectral sensitivity characteristic chart of a general solid-state image pickup device shown in FIG. 3(a) and a light emission wavelength characteristic chart of signal lamps using LED light-emitting devices shown in FIG. 3(b) (indicating a unimodal characteristic in which a red signal has a peak at 630 nm±5, a yellow signal has a peak at 592 nm±5, and a green signal has a peak at 503 nm±5 and the signals respectively have half-widths of 30 nm to 50 nm).

In FIG. 3(a), the abscissa represents wavelength (nm) and the ordinate represents relative sensitivity.

In FIG. 3(b), the abscissa represents wavelength (nm) and the ordinate represents relative light emission intensity.

When a spectral sensitivity characteristic of a red channel of the 1CCD solid-state image pickup device 4 shown in the figure and a light emission wavelength characteristic of an LED light-emitting device having a unimodal characteristic having a peak at 630 nm±5 of the red signal are combined, even if a pixel output signal during red signal lighting of the signal lamp 2 of the traffic signal is a red (R) signal, green (G) signal and blue (B) signal components are included. Therefore, when a red signal level input to the RGB ratio detecting means 12 is 90 to 100%, the pixel output signal is controlled by the color mixture controlling means 14 such that a green signal level is 5±2% and a blue signal level is 4±2% or a ratio is 0, 0% (Expression 3 below) and output as a red signal lighting region of the red signal.

Actuation in the bright daytime and actuation at night of the monitoring camera apparatus 1 according to the present invention are explained.

<Color Reproducibility of a Red Signal in the Daytime>

Figure 4:
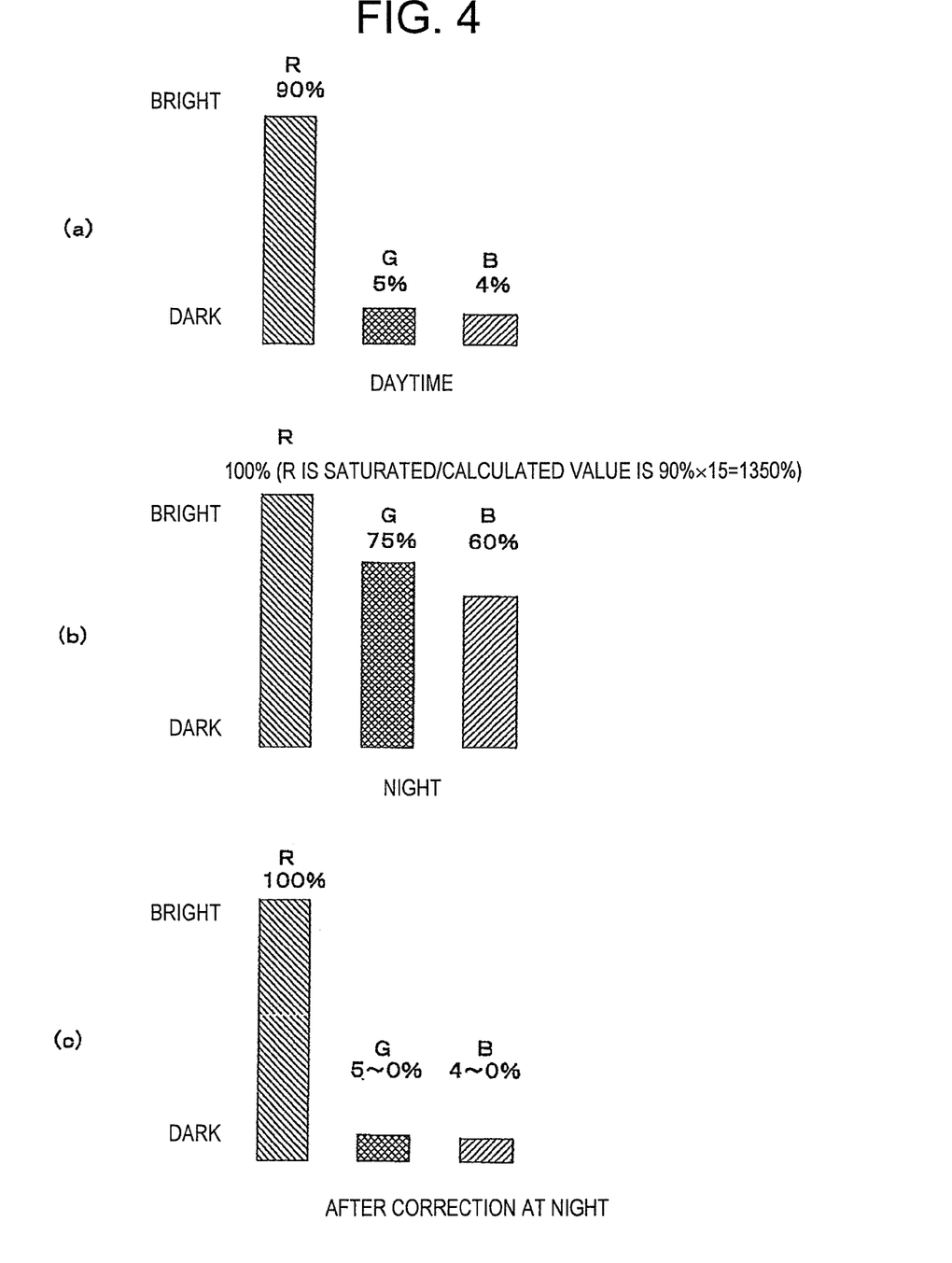
FIG. 4 is a color reproducibility explanatory diagram of a red signal lamp of a traffic signal in the daytime and at night in the embodiment of the present invention.

In FIG. 4, in a color reproducibility explanatory diagram of a red signal lamp of a traffic signal in the daytime in the figure, FIG. 4(a) shows level ratios of RGB signals indicating color reproducibility of the red signal lamp of the traffic signal in the bright daytime.

In the daytime, the brightness of a signal and the peripheral brightness are considered to be the same level. A level RSD (Response of Signal at Daylight=% indication. A measured value) of a red signal of a pixel output signal of the solid-state image pickup device 4 is as indicated by Expression below.

$$RSD=90R+5G+4B \quad \text{(Expression 1)}$$

A generally red color is reproduced.

<Color Reproducibility of a Red Signal at Night>

At night, since the periphery of the signal lamp 2 darkens, the lens aperture controlling means, the electronic shutter controlling means of the solid-state image pickup device, and the gain controlling means 13 are actuated to perform control for brightening the entire screen.

If it is assumed that 15-times multiplication gain control is performed, as shown in FIG. 4(b), an RSN (Response of signal at Night=% indication. A measured value) is as indicated by Expression below.

$$RSN=100R+75G+60B \quad \text{(Expression 2)}$$

A red signal is not red but light yellow.

A theoretical value of 100R is 90R×15=1350R. However, since an R signal exceeding 100% is compressed to a specified level of 100% by white compression and knee correction, a measured value of the RSN is as indicated by Expression 2.

When an RSN signal of a ratio indicated by Expression 2 is input to the saturated region detecting means 15, the saturated region detecting means 15 detects that a signal level of the red signal lamp 2 of the traffic signal exceeds 100%, attenuates the signal level to be equal to or lower than a saturated level with the lens aperture controlling means, the electronic shutter controlling means of the solid-state image pickup device, and the gain controlling means 13 and then inputs the RSN signal to the RGB ratio detecting means 12. If the ratios are R>G≈B, the saturated region detecting means 15 specifies the red signal lamp 2 as a red signal lighting region of the red signal lamp, further attenuates GB signals in the red signal lighting region or reduces the GB signal to zero and reduces color mixture in the red signal lighting region with the color mixture controlling means 14, and outputs lighting of the red signal lamp as a red color from the output terminal 16 of the color mixture controlling means 14 to the outside.

As a result, an RSN is represented by Expression 3 below (% indication) at ratios shown in FIG. 4(c).

$$RSN=90 \text{ to } 100R+5 \text{ to } 0G+4 \text{ to } 0B \quad \text{(Expression 3)}$$

In other words, the red signal is output as a normal R signal or an R signal without color mixture and displayed on the monitor 17 as a red signal lamp.

In the above explanation, the signal lamp is specified as the red signal lighting region of the red signal lamp on the basis of coordinate position information and region information during lighting of the signal lamp. However, as another method, the signal controlling means 7 may detect, on the basis of a signal lamp position synchronized with a lighting/extinguishing time of the signal lamp 2 of the traffic signal, ratios of RGB signal levels of the respective signal lamps of green, yellow, and red, specify the signal lamp 2 as a red signal lighting region of the red signal lamp if R>G≈B, attenuate GB signals in the red signal lighting region or reduce the GB signal to zero and reduce color mixture in the red signal lighting region with the color mixture controlling means 14, and make it possible to display lighting of the red signal lamp as a red color on the monitor 17.

Further, when the signal lamp of the traffic signal repeats lighting and extinguishing in the order of green, yellow, red, and green, in a lighting/extinguishing time of the lighting and the extinguishing, the lighting and the extinguishing are repeated at a time interval of green>yellow<red≈green. Therefore, lighting coordinate position information and lighting region information of the signal lamp can be detected in synchronization with the lighting/extinguishing time or the lighting/extinguishing time interval. A red signal lighting region of the red signal lamp can be specified from RGB signal level ratios of the respective signal lamps of green, yellow, and red.

When red and yellow signals are alternately blinking in an intersection or when two signals of red and green for alternating traffic during construction or the like are blinking, similarly, lighting coordinate position information and lighting region information of the signals can be detected in synchronization with a lighting/extinguishing time or a lighting/extinguishing time interval.

In the above explanation, a red signal lighting region of the red signal lamp is specified. Lighting regions can also be specified for the yellow and green signal lamps.

In the yellow signal lamp, when a spectral sensitivity characteristic of the 1CCD solid-state image pickup device 4 and a light emission wavelength characteristic of an LED light-emitting device having a unimodal characteristic having a peak at 592 nm±5 of the yellow signal are combined, ratios of RGB signal levels of the yellow signal lamp are R≈100%, G≈36%, and B≈1% or less. Therefore, it is also possible to specify, on the basis of a signal lamp lighting coordinate position having the signal levels R>G>B, the signal lamp as a yellow signal lighting region of the yellow signal lamp, attenuate a B signal or reduce the B signal to zero with the color mixture controlling means 14, maintain the ratios for RG signal levels, and display lighting of the yellow signal lamp as a yellow color on the monitor.

In the green signal lamp, when a spectral sensitivity characteristic of the 1CCD solid-state image pickup device 4 and a light emission wavelength characteristic of an LED light-emitting device having a unimodal characteristic having a peak at 503 nm±5 of the blue signal are combined, ratios of RGB signal levels of the green signal lamp are G≈100%, B≈80%, and R≈1% or less. Therefore, it is also possible to specify, on the basis of a signal lamp lighting coordinate position having the signal levels G>B>R, the signal lamp as a green signal lighting region of the green signal lamp, attenuate an R signal or reduce the R signal to zero with the color mixture controlling means 14, maintain the ratios for GB signal levels, and display lighting of the green signal lamp as a green color on the monitor.

Furthermore, it is possible to prevent color mixture due to sunlight or peripheral illumination light reflected on the surfaces of the respective signal lamps in the daytime and at night and output the signal lamps as original signal colors of the signal lamps 2 of the traffic signal.

Specifically, the signal controlling means 7 can store, in the memory 9, respective RGB signal levels during lighting and during extinguishing of a region specified as a red signal lighting region of the red signal from RGB signal ratios of the signal lamp 2 of the traffic signal, subtract the RGB signal levels during the extinguishing from the RGB signal levels during the lighting on the basis of respective signal levels during the lighting and during the extinguishing of the red signal lighting region read out from the memory 9 and then attenuate GB signal in the red signal lighting region or reduce the GB signal to zero and reduce color mixture due to reflection of the red signal lighting region with the color mixture controlling means 14, and display lighting of the red signal lamp as a red color on the monitor 17.

Further, the respective positions of the yellow signal lamp and the green signal lamp are detected in the same manner, RGB signal levels during lighting and during extinguishing are stored in the memory 9 from RGB signal ratios of the signal lamps, and the RGB signal levels during the extinguishing are subtracted from the RGB signal levels during the lighting on the basis of respective signal levels during the lighting and during the extinguishing read out from the memory 9. Consequently, it is also possible to obtain action and an effect for reducing color mixture due to reflection.

The memory 9 stores in advance xy coordinate values and lighting regions of the respective signal lamps of red, yellow, and green output from the color mixture controlling means 14 for which color mixture of the respective signal lamp colors is controlled. The xy coordinate values and the lighting regions of the respective signal lamps are always read out from the memory 9. Consequently, it is possible to continuously use the xy coordinate values and the lighting regions for detection of the respective signal lamps.

There is a signal lamp in which only an illustration portion of a doll (or something that indicates possibility of walking such as a handprint) is designed to flash on a black base and a red signal and a green signal for pedestrian are arrayed in the longitudinal direction (or the lateral direction) using an LED light-emitting device. It is possible to detect the signal as a signal lamp for pedestrian on the basis of a region indicated by xy coordinate values and lighting/extinguishing times or lighting/extinguishing time intervals of the two arrayed red and green signal lamps in the same manner as the three arrayed signal lamps for car shown in FIG. 2, specify the signal lamp as a red signal lamp for pedestrian if R>G≈B and attenuate GB signals or reduce the GB signals to a zero level and specify the signal lamp as a green signal lamp for pedestrian if G>B>R, maintain ratios of GB signal levels, and attenuate an R signal or reduces the R signal to a zero level, and outputs RGB signals from the color mixture controlling means 14.

Figure 5:
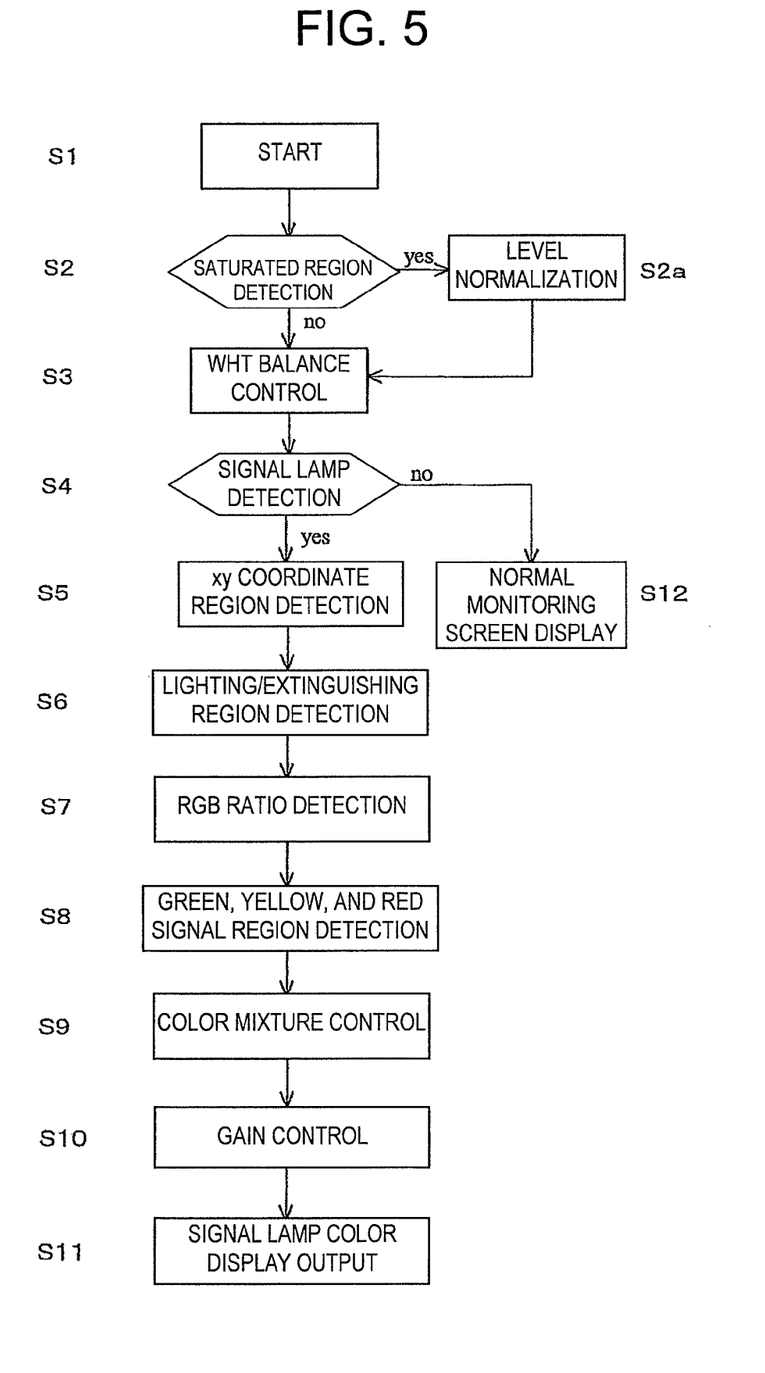
FIG. 5 is a flowchart for explaining action of the monitoring camera apparatus according to the embodiment of the present invention.

Action order of the respective means is explained on the basis of a flowchart of FIG. 5 for explaining action of the monitoring camera apparatus according to the embodiment of the present invention.

When the apparatus starts in step S1 "start", first, in step S2 "saturated region detection", the apparatus detects, with the saturated region detecting means 15, whether RGB signal levels in an image pickup region exceed 100% and are in a saturated state. In the case of "yes", in step S2*a* "level normalization", the apparatus actuates any one of the electronic shutter controlling means of the solid-state image pickup device and the gain controlling means 13 or redundantly actuates the electronic shutter controlling means of the solid-state image pickup device and the gain controlling means 13 to attenuate the signal levels to be equal to or lower than a saturated level and shifts to step S3 "WHT balance control".

When the RGB signal levels are a proper value and in the case of "no" in which there is no saturated region or when the RGB signal levels are normalized in step S2*a* "level normalization", in step S3 "WHT balance control", the apparatus keeps a white balance with the white balance controlling means 8 using a publicly-known technique for, for example, using a white signal in an object image picked up immediately before the signal lamp detecting means 10 is actuated.

After the execution of the white balance, in step S4 "signal lamp detection", the signal lamp detecting means 10 operates and detects, on the basis of spectral sensitivity characteristics of the solid-state image pickup device 4 of respective RGB signals output from the solid-state image pickup device 4 and a light emission wavelength characteristic of the LED light-emitting devices, the three signal lamp 2 arrayed in the lateral direction or the longitudinal direction in the image pickup region and in series and periodically repeatedly lit and extinguished.

Further, in step S5 "xy coordinate region detection", the signal lamp detecting means 10 detects a region indicated by xy coordinate values of pixels from signal levels and lighting duration of respective horizontal scanning lines during lighting of the respective signal lamps 2.

In the case of "no" in step S4 "signal lamp detection" in which the signal lamp 2 is not detected, the apparatus shifts to step S12 "normal monitoring image display" and displays a normal monitoring screen on the monitor 17.

After the region indicated by the xy coordinate values is detected, the apparatus shifts to step S6 "lighting/extinguishing region detection". The lighting/extinguishing region detecting means 11 detects regions indicated by the xy coordinate values of the signal lamp 2 during the lighting periodically repeatedly output from the signal lamp detecting means 10, signal levels during lighting of the respective signal lamps 2 also periodically repeated, and xy coordinate values of pixels within extinguish duration (e.g., time after the green signal lamp is lit and then extinguished until the green signal lamp is lit next is the extinguishing duration) to thereby specify that the signal lamp 2 is the signal lamp 2 of the traffic signal periodically repeatedly lit and extinguished and sends an output signal of the signal lamp 2 to the RGB ratio detecting means 12.

In step S7 "RGB ratio detection", the apparatus compares, with the RGB ratio detecting means 12, ratios of the RGB signal levels of the region indicated by the xy coordinate values of the pixels of the signal lamp 2.

Subsequently, in step S8 "green, yellow, and red signal region detection", the apparatus can detect and specify the signal lamp 2 as a red signal lamp, if image signal levels of the RGB signals of the region indicated by the xy coordinate values are R>G≈B (or R>>G, B), as a yellow signal lamp if the image signal levels are R>G>B (or R, G>>B), and as a green signal lamp if the image signal levels are G>B>R (or G, B>>R).

In step S9 "color mixture control", the apparatus maintains, with the color mixture controlling means 14, GB signals in the red signal lighting region, a B signal in a yellow signal lighting region, and GB signals in a green signal lighting region, attenuates an R signal or reduces the R signal to zero and reduces color mixture in the respective signal lighting regions, and displays lighting of the red signal lamp as a red color, lighting of the yellow signal lamp as a yellow color, and lighting of the green signal lamp as a green color on the monitor 17.

At the same time, the signal controlling means 7 can read out respective signal levels during lighting and during extinguishing of the respective signal lighting regions read out from the memory 9 and subtract RGB signal levels during the extinguishing from RGB signal levels during the lighting to thereby reduce color mixture due to reflection in the respective lighting regions.

In step S10 "gain control", signal levels of all image pickup regions including RGB signal levels without color mixture and reflection in step S9 "color mixture control" are controlled to proper values by the gain controlling means 13.

Subsequently, in step 11 "signal lamp color display output", the RGB signals level-controlled to the proper values are displayed on the monitor 17 via the output terminal 16 in lighting colors just like display colors of the respective signal lamps.

Second Embodiment

In this embodiment, the signal lamp detecting means 10 of the signal controlling means 7 includes a circuit function for recognizing the shape and the number of signal lamps to thereby specify the signal lamp 2 as the signal lamp 2 of the traffic signal from the shape such as a circle and the number of the three or two signal lamps 2 of the traffic signal arrayed in the lateral direction or the longitudinal direction in series, detect ratios of RGB signal levels of the respective signal lamps of green, yellow, and red in a region portion of the shape, specify the region portion as a red signal lighting region of the red signal lamp if R>G≈B, attenuate GB signals in the red signal lighting region or reduce the GB signal and reduce color mixture in the red signal lighting region with the color mixture controlling means 14, and make it possible to display lighting of the red signal lamp as a red color on the monitor 17.

Therefore, the lateral or longitudinal three or two signal lamps 2 of the traffic signal are recognized by the shape and the number and specified as a red signal lighting region of the red signal lamp. Therefore, it is possible to clearly distinguish the signal lamps 2 from illuminations, lightings, or the like having other shapes and display lighting of the red signal lamp as a red color on the monitor 17 at night.

The other components and action are equivalent to those in the first embodiment.

Third Embodiment

In this embodiment, the signal controlling means 7 receives a blinking control signal for the signal lamp 2 of the traffic signal by setting a wire or wireless transceiver, specifies a red signal lamp lit on the basis of a blinking control signal for the red signal lamp as a red signal lighting region, and attenuates GB signals in the red signal lighting region or reduces the GB signals to zero and reduces color mixture in the red signal lighting region with the color mixture controlling means 14 to thereby make it possible to display lighting of the red signal lamp as a red color on the monitor 17.

Therefore, it is possible to receive the blinking control signal for the signal lamp 2 of the traffic signal and recognize the lit red signal lamp as the red signal lighting region irrespective in the daytime or at night. It is possible to most accurately recognize the red signal lighting region of the red signal lamp even in a saturated state.

Similarly, it is also possible to receive a blinking control signal for a green signal lamp and a yellow signal lamp of the traffic signal, recognize the green signal lamp and the yellow signal lamp as a green signal lighting region and a yellow signal lighting region, and surely display the green signal lighting region and the yellow signal lighting region as the green signal lamp and the yellow signal lamp on the monitor.

The other components and action are equivalent to those in the first embodiment.

Fourth Embodiment

In this embodiment, the signal controlling means 7 stores, in the memory 9, a red signal lighting region specified as the red signal lighting region of a red signal from RGB signal ratios of the signal lamp 2 of the traffic signal not saturated in the daytime, attenuates GB signals in the red signal lighting region or reduces the GB signals to zero and reduces color mixture in the red signal lighting region with the color mixture controlling means 14 on the basis of red signal lighting region information always read out from the memory 9, and makes it possible to display lighting of the red signal lamp as a red color on the monitor 17.

Therefore, a signal read out from the memory 9 is specified as the red signal lighting region even in a state in which the signal lamp 2 of the traffic signal is saturated at night. Therefore, it is unnecessary to detect ratios of RGB signal levels of the respective signal lamps of green, yellow, and red. It is possible to attenuate GB signals in the red signal lighting region or reduce the GB signals to zero and reduce color mixture in the red signal lighting region with the color mixture controlling means 14 and accurately output the red signal lamp as a red signal.

The other components and action are equivalent to those in the first embodiment.

INDUSTRIAL APPLICABILITY

When an image of an intersection or the like where a signal lamp of a traffic signal exists is picked up by a monitoring camera apparatus at night or during rainy weather, in order to pick up an image of a peripheral situation bright, if a lens aperture is set in an opening direction to increase a gain with electronic shutter controlling means of a solid-state image pickup device and gain controlling means, in particular, a red signal of the signal lamp of the traffic signal is saturated to change to light yellow or white and misrecognized on a monitor.

The present invention detects ratios of RGB signal levels on the basis of lighting positions, lighting/extinguishing times, lighting/extinguishing time intervals, and the shape and the number of respective signal lamps of green, yellow, and red and blinking control signals for the signal lamps, specifies the signal lamps as a red signal lighting region of a red signal lamp if R>G≈B, attenuates GB signals in the red signal lighting region or reduces the GB signal to zero and reduces color mixture in the red signal lighting region with the color mixture controlling means, and makes it possible to display lighting of the red signal lamp as a red color on the monitor.

REFERENCE SIGNS LIST

1: monitoring camera apparatus
2: signal lamp
3: lens
4: solid-state image pickup device
5: S/H (sample hold circuit)
6: A/D conversion means
7: signal controlling means
8: white balance controlling means
9: memory
10: signal lamp detecting means
11: lighting/extinguishing region detecting means
12: RGB ratio detecting means
13: gain controlling means (including a signal processing circuit)
14: color mixture controlling means
15: saturated region detecting means
16: output terminal
17: monitor
18: image pickup region
19: signal lamp image
20: solid-state image pickup device driving means (including electronic shutter controlling means)
21: synchronization signal generating means

The invention claimed is:

1. A monitoring camera apparatus comprising: a solid-state image pickup device; and signal controlling means corresponding to each of RGB signals of an object image output from the solid-state image pickup device, the monitoring camera apparatus monitoring a street including a traffic signal, wherein the signal controlling means includes:
signal lamp detecting means for detecting lighting of signal lamps including LED light-emitting devices of a traffic signal present in an image pickup region of the solid-state image pickup device;
lighting/extinguishing region detecting means for detecting a lighting/extinguishing region for periodically repeating lighting, extinguishing, and lighting of the detected signal lamps;
RGB ratio detecting means for detecting ratios of RGB signals of the lighting/extinguishing region output from the lighting/extinguishing region detecting means;
color mixture controlling means for controlling color mixture of signal lamp colors; and
gain controlling means for controlling a gain of the RGB signals, the signal lamp detecting means detects, on the basis of a spectral sensitivity characteristic of the solid-state image pickup device and a light emission wavelength characteristic of the LED light-emitting devices of each of the RGB signals output from the solid-state image pickup device, three regions indicated by xy coordinate values of pixels arrayed in a lateral direction or a longitudinal direction in the image-pickup region and in series and periodically repeatedly lit and extinguished, the lighting/extinguishing region detecting means specifies, on the basis of the regions indicated by the xy coordinate values of the pixels output from the signal lamp detecting means, the three lit/extinguished lighting/extinguishing regions and sends the lighting/extinguishing regions to the RGB ratio detecting means, the RGB ratio detecting means compares levels of the RGB signals during the lighting of the lighting/extinguishing regions and detects the signal lamp as a red signal lamp if R>G≈B, as a yellow signal lamp if R>G>B, and as a green signal lamp if G>B>R, the RGB ratio detecting means further specifies, on the basis of a region indicated by the xy coordinate value of the pixel of the lighting/extinguishing region having a signal level of R>G≈B, the region as a red signal lighting region and sends the red signal lighting region to the color mixture controlling means, the color mixture controlling means attenuates GB signals in the red signal lighting region or reduces the GB signals to zero, reduces color mixture in the red signal lighting region, and sends the RGB signals to the gain controlling means, and the gain controlling means controls an input R signal to enable a lighting region of the red signal lamp to be displayed as a proper red color on a monitor.

2. The monitoring camera apparatus according to claim 1, wherein the RGB ratio detecting means compares, on the basis of a region indicated by the xy coordinate values of the pixels that output signals in synchronization with lighting times of green, yellow, and red signal lamps of the traffic signal, respective RGB signal levels in the specified lighting/extinguishing region of the respective signal lamps of green, yellow, and red, specifies the lighting/extinguishing region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

3. The monitoring camera apparatus according to claim 1, wherein the RGB ratio detecting means compares, on the basis of a region indicated by the xy coordinate values of the pixels where an output signal level changes in synchronization with a lighting/extinguishing time or a lighting/extinguishing time interval of each of green, yellow, and red signal lamps of the traffic signal, RGB signal levels in the specified lighting/extinguishing region of the respective signal lamps of green, yellow, and red, specifies the region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

4. The monitoring camera apparatus according to claim 1, wherein the signal controlling means includes saturated region detecting means for detecting a saturated region of the RGB signals, when the saturated region of the RGB signals is detected by the saturated region detecting means according to sensitivity raising control at night or during rainy weather, the signal controlling means attenuates a signal level to be equal to or lower than a saturated level with the electronic shutter controlling means of the solid-state image pickup device and the gain controlling means, and the RGB ratio detecting means compares, on the basis of a region indicated by the xy coordinate values of the pixels where an output signal level changes in synchronization with a lighting/extinguishing time or a lighting/extinguishing time interval of each of green, yellow, and red signal lamps of the traffic signal, RGB signal levels in the specified lighting/extinguishing region of the respective signal lamps of green, yellow, and red, specifies the region as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

5. The monitoring camera apparatus according to claim 1, wherein the signal controlling means recognizes a shape of the signal lamps of the traffic signal, compares RGB signal levels of the respective signal lamps of green, yellow, and red in a portion of the shape, specifies the portion as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

6. The monitoring camera apparatus according to claim 1, wherein the signal controlling means includes saturated region detecting means for detecting a saturated region of the RGB signals, when the saturated region of the RGB signals is detected by the saturated region detecting means according to sensitivity raising control at night or during rainy weather, the signal controlling means attenuates a signal level to be equal to or lower than a saturated level with the electronic shutter controlling means of the solid-state image pickup device and the gain controlling means and then recognizes a shape of the signal lamps of the traffic signal, compares RGB signal levels of the respective signal lamps of green, yellow, and red in a portion of the shape, specifies the portion as a red signal lighting region if R>G≈B, attenuates GB signals in the red signal lighting region or reduces the GB signals to zero and reduces color mixture in the red signal lighting region with the color mixture controlling means, and makes it possible to display lighting of the red signal lamp as a red color on the monitor.

7. The monitoring camera apparatus according to claim 1, wherein the signal controlling means receives blinking control signals of the signal lamps of the traffic signal, specifies the red signal lamp lit on the basis of a blinking control signal of the red signal lamp as a red signal lighting region, attenuates GB signals in the red signal lighting region or reduces the GB signals to zero and reduces color mixture in the red signal lighting region with the color mixture controlling means, and makes it possible to display lighting of the red signal lamp as a red color on the monitor.

8. The monitoring camera apparatus according to claim 1, wherein the signal controlling means stores, in a memory, the red signal lighting region specified as a red signal lighting region of a red signal from RGB signal ratios of the signal lamps of the traffic signal not saturated in the daytime, attenuates GB signals in the red signal lighting region or reduces the GB signals to zero and reduces color mixture in the red signal lighting region with the color mixture controlling means on the basis of the red signal lighting region always read out from the memory, and makes it possible to display lighting of the red signal lamp as a red color on the monitor.

9. The monitoring camera apparatus according to claim 8, wherein the signal controlling means stores, in a memory, respective RGB signal levels during lighting and during extinguishing of the signal lamps of the traffic signal and subtracts the RGB signal levels during the extinguishing from the RGB signal levels during the lighting on the basis of respective signal levels during the lighting and during the extinguishing of the signal lamps read out from the memory.

* * * * *